United States Patent Office 3,585,173
Patented June 15, 1971

3,585,173
OLEFIN COPOLYMERS AND PROCESS FOR
PREPARING SAME
Giulio Natta, Giorgio Mazzanti, Alberto Valvassori,
Guido Sartori, and Nazzareno Cameli, Milan, Italy,
assignors to Montecatini Edison S.p.A., Milan, Italy
No Drawing. Continuation-in-part of application Ser. No.
303,174, Aug. 16, 1963. This application Nov. 10, 1965,
Ser. No. 507,231
Claims priority, application Italy, Aug. 17, 1962,
678,563/62
Int. Cl. C08f 15/40
U.S. Cl. 260—79.5
19 Claims

ABSTRACT OF THE DISCLOSURE

There are disclosed high-molecular weight copolymers and more particularly substantially linear, amorphous copolymers of a methyl-substituted tetrahydroindene and at least one monomer selected from the group consisting of ethylene and higher alpha-olefins of the general formula R—CH=CH$_2$ in which R is an alkyl group containing from 1 to 6 carbon atoms, which are capable of being vulcanized. There is also disclosed a process for preparing the linear, amorphous, high molecular weight copolymers capable of being vulcanized. The process comprises the use of catalysts acting with a coordinated anionic mechanism.

---

This application is a continuation-in-part of our application Ser. No. 303,174 filed Aug. 16, 1963.

Earlier Natta, Mazzanti and Boschi disclosed linear, amorphous copolymers of ethylene and propylene which, although saturated, are capable of being vulcanized to very useful, commercially acceptable elastomers.

The only drawback associated with those new, linear, amorphous copolymerizates is the fact that, because of their saturated character, said copolymerizates are not readily vulcanizable by means of the sulfur-containing recipes which have been used traditionally in the rubber industry.

Various polyenes have been proposed for inclusion with the ethylene and propylene to be copolymerized to the linear, amorphous copolymers of Natta et al. as aforementioned, with the objective of producing such copolymerizates which, while being essentially the Natta et al. products, are modified to the extent of having some unsaturations distributed along the macromolecules therof, thus facilitating vulcanization of the copolymerizates by means of the sulfur-containing recipes or mixes which are conventional in the rubber industry.

In our application Ser. No. 303,174 filed Aug. 16, 1963, we disclosed certain polycyclic polyenes as being useful modifiers of the Natta et al. linear, amorphous ethylene/ higher alpha-olefin copolymerizates for introducing sites of unsaturation into the macromolecules of the copolymerizates and thereby obtaining modified copolymerizates vulcanizable to good elastomers with the aid of the sulfur-containing recipes normally used in the rubber industry.

We also disclosed that the new amorphous and linear terpolymers (modified ethylene/higher alpha-olefin copolymers) could be obtained by subjecting a mixture of ethylene, higher alpha-olefin, and selected polycyclic polyenes to polymerizing conditions in contact with catalysts prepared from compounds of transition metals of Group V and organometallic compounds of metals of Groups I, II or III, organometallic complex compounds of metals of Groups I and III, or hydrides or complex hydrides of said metals, in an inert extraneous solvent or in the absence of an extraneous solvent and using the mixture of monomers maintained in the liquid state as the polymerization medium.

This application is directed, more specifically, to the embodiment of our invention involving the polymerization of mixtures of ethylene, or mixtures of ethylene and a higher alpha-olefin CH$_2$=CHR in which R is an alkyl radical containing 1 to 6 carbon atoms, with alkyl polycyclic polyenes, more particularly those selected from the group consisting of 6-methyl-4,7,8,9-tetrahydroindene and 5,6-dimethyl-4,7,8,9-tetrahydroindene.

The copolymerization (including terpolymerization) with the catalysts as disclosed in our parent application aforesaid can be carried out in an inert solvent, which may be an aliphatic, cycloaliphatic or aromatic hydrocarbon solvent such as butane, pentane, n-heptane, cyclohexane, toluene, xylene and mixtures thereof. However, in the case of the alkylated tetrahydroindenes with which this application is concerned, it is particularly advantageous, and therefore preferred, to carry out the copolymerization in the absence of an inert extraneous solvent and to use the mixture of monomers, maintained in the liquid state, as the copolymerization medium.

Although an inert extraneous solvent can be used, such as the solvents disclosed in the parent application and exemplified hereinabove, the advantages of operating without the need for such a solvent are of great importance in commercial practice, since the advantages include the elimination of expensive operations involving recovery and recycling of large amounts of solvents and the fact that the copolymerizate formed is insoluble in the liquid monomers mixture so that it is suspended in such liquid monomers mixture and can be easily recovered therefrom in particulate form. The insolubility of the copolymerizate of the copolymerizate in the reaction medium leads to a neglegible increase in the viscosity of the reaction mass unlike in the case of solution copolymerization and therefore much higher copolymer contents per volume unit may be attained.

The use of an inert extraneous solvent such as, for instance, n-heptane was found by us to be preferable when the polycyclic polyene selected for modifying the vulcanizability potential of the linear, amorphous ethylene/ higher alpha-olefin copolymerizates was one free of side groups in correspondence with a double bond, such as, for example, tetrahydroindene or 4 methyltetrahydroindene in order to avoid, as a certainty, the possibility of cross-linking of the macromolecular chains during the production of the polymerizate.

We have found that using the alkyl-substituted polycyclic polyenes, in which only one of the double bonds is free of alkyl substituents, and more specifically 6-methyl-4,7,8,9-tetrahydroindene and/or 5,6-dimethyl-4,7,8,9-tetrahydroindene, for obtaining the modified ethylene/higher alpha-olefin copolymerizates having unsaturations distributed randomly in the macromolecules thereof, the copolymerization can be carried out in the medium comprising the mixture of monomers in the liquid state, without any risk of cross-linking of the chains during the copolymerization reaction, and that, moreover, under such conditions the yield of linear copolymerizate obtained per weight unit of catalyst used is higher than when the reaction is effected in an inert extraneous solvent.

The catalysts used in carrying out this preferred embodiment of our invention according to which the selected polycyclic polyenes are alkyl-substituted, are the same as disclosed in our parent application Ser. No. 303,174.

As indicated, said catalysts are prepared from compounds of transition metals Group V of the Periodic Table according to Mendeleeff and orgometallic compounds of Groups I, II and III or organometallic complex compounds of metals of Groups I and III of said table. In addition, the hydrides and complex hydrides of the metals belonging to Groups I to III may be used as one catalyst-forming component.

As we noted in the parent application, the coordinated anionic catalysts are not capable of homopolymerizing the polycyclic polyenes or alkyl-substituted polycyclic polyenes with which we are concerned. It was, and is, very surprising, therefore, that the catalysts disclosed herein and in the parent application do promote the polymerization of the polycyclic polyenes and alkyl derivatives thereof in the presence of ethylene, or of ethylene and the higher alpha-olefin, to yield true copolymers or terpolymers consisting of macromolecules made up of polymerized units of each of the starting monomers, including the alkyl-substituted tetrahydroindenes.

Since the catalysts used do not homopolymerize the alkyl-substituted tetrahydroindenes, the polymerized units of those monomers do not occur in direct sequence in the copolymers or terpolymers but are dispersed in the polymeric chain. Consequently, the double bonds, one of which remains free in each of the polymerized units of the alkyl-substituted polycyclic polyene, are also dispersed or scattered along the macromolecular main chains of the copolymer or terpolymer.

The methyl-substituted tetrahydroindenes used in the practice of this invention can be prepared readily by a Diels-Alder condensation reaction between cyclopentadiene and isoprene (to produce 6-methyl-4,7,8,9-tetrahydroindene) or between cyclopentadiene and dimethylbutadiene (to produce 5,6-dimethyl-4,7,8,9-tetrahydroindene).

The olefins which are copolymerized with the above-mentioned dienes consist of ethylene and the higher aliphatic alpha olefins of the general formula $R-CH=CH_2$ wherein R is an alkyl group containing 1 to 6 carbon atoms. Specific examples of olefins within the general formula include propylene, and butene-1. By copolymerizing, for example, a mixture of ethylene, propylene and/or butene-1 with 6-methyl-4,7,8,9-tetrahydroindene under the process conditions of this invention, a crude copolymerization product was obtained which comprised macromolecules consisting of copolymerized units of ethylene, propylene and/or butene-1 and in which the polymerized units of the methyl-tetrahydroindene were distributed at random. The distribution was such that in no instance did two consecutive methyl-tetrahydroindene units occur. Moreover, each of the monomeric units derived from the polymerization of the diene contained one free unsaturation. An infrared spectrographic examination of the copolymer showed the presence of unsaturations with bands at about 6 microns. These sites of unsaturation are reactive and may be used for subsequent reactions. Thus, for example, it is possible to vulcanize the copolymer with sulfur-containing mixtures of type normally used for vulcanizing unsaturated rubbers. Peroxy-type vulcanization mixes may also be used. The double bonds present in the macromolecules, e.g. after oxidation with ozone, may be used, also, to form polar groups such as carboxylic groups, which in turn can be used as reactive sites in subsequent reactions. An example is vulcanization with a polyvalent basic material. Further, double bonds may be used for addition reactions with metal hydrides such as lithium hydride, $NaBH_4$, $AlH(C_4H_9)_2$, etc. The metal-to-carbon bonds formed may be used in subsequent reactions.

Copolymers prepared in accordance with this invention have a substantially linear structure as indicated by the fact that the copolymers have properties, in particular a viscous behaviour, almost identical with those of other known linear copolymers, e.g., ethylene and alpha-olefin copolymers. These copolymers have a molecular weight, determined viscosimetrically, higher than 20,000 which corresponds to an intrinsic viscosity, as determined in tetrahydronaphthalene at 135° C. or in toluene at 30° C., greater than 0.5. The intrinsic viscosity of these polymers, however, may range from about 0.5 to 10 and in many instances may be higher. For most practical purposes, however, copolymers having intrinsic viscosities ranging from about 1 to 5 are preferred.

The composition of the copolymers of this invention may be characterized as being practically homogeneous with the different monomeric units being distributed at random. The homogeneity of these copolymers is confirmed by the fact that they yield good vulcanized products when they are vulcanized under the conditions used conventionally for vulcanizing unsaturated rubber and particularly the low unsaturated rubbers such as butyl rubber.

The good distribution of the double bonds or sites of unsaturation along the polymeric chain is confirmed by the fact that the vulcanized products obtained from the copolymers are completely insoluble in organic solvents such as aliphatic hydrocarbons and are only swollen to a limited extent in some of the aromatic solvents. In comparison, the non-vulcanized polymers are completely soluble in boiling n-heptane. Moreover, the vulcanized products exhibit good mechanical strength and a low residual deformation at break.

The catalytic systems to be employed in the process of this invention are either solutions, dispersions, or amorphous colloidal dispersions in hydrocarbons. The hydrocarbons which may be employed in preparing the catalysts include, for example, the aliphatic, cycloaliphatic and aromatic hydrocarbons either halogenated or not and mixtures thereof. The small amount of solvent introduced with the catalyst or catalyst-forming components is the only extraneous solvent present in the system, in the preferred embodiment.

The organometallic compounds or hydrides which may be employed in the preparation of a catalyst used according to this invention are selected from the group consisting of lithium alkyls, lithium-aluminum tetraalkyls, beryllium dialkyls, beryllium alkylhalides, beryllium diaryls, aluminum trialkyls, aluminum dialkylmonohalides, aluminum monoalkyldihalides, aluminum alkenyls, aluminum alkylenes, aluminum cycloalkyls, aluminum cycloalkylalkyls, aluminum aryls, aluminum alkylaryls, or complexes of the above-mentioned organoaluminum compounds with weak Lewis bases, lithium hydride, lithium aluminum alkylhydrides, lithium aluminum hydride, aluminum alkylhydrides, aluminum halohydrides, zinc hydride and calcium hydride.

Organoaluminum compounds wherein the metal is bound by main valences not only to carbon and/or halogen atoms but also to oxygen atoms bound to an organic group, such as, e.g., aluminum dialkyl alkoxides and aluminum alkylalkoxy-halides can also be used as one catalyst-forming component.

Non-restrictive examples of organometallic compounds or hydrides that can be used in the preparation of the catalyst include lithium butyl, lithium aluminum tetrabutyl, lithium aluminum tetrahexyl, lithium aluminum tetraoctyl, beryllium dimethyl, beryllium methyl chloride, beryllium diethyl, beryllium di-n-propyl, beryllium diisopropyl, beryllium di-n-butyl, beryllium di-tert. butyl, beryllium diphenyl, aluminum triethyl, aluminum tri-isobutyl, aluminum trihexyl, aluminum diethyl monochloride, aluminum diethylmonoiodide, aluminum diethylmonofluoride, aluminum di-isobutylmonochloride, aluminum monoethyldichloride, aluminum butenyldiethyl, aluminum isohexenyldiethyl, 2-methyl-1,4-di-(diisobutylaluminum) butane, aluminum tri-(dimethylcyclopentylmethyl), aluminum triphenyl, aluminum tritolyl, aluminum di-(cyclopentylmethyl) monochloride, aluminum diphenyl monochloride, aluminum diisobutylmonochloride complexed with anisole, aluminum monochloromonoethylmonoethoxide, aluminum diethyl propoxide, and aluminum monochloromonopropyl monoethoxide, aluminum diethylmonohydride, aluminum diisobutylmonohydride, aluminum monoethyldihydride, lithium aluminum diisobutyl dihydride, and aluminum chlorohydride.

The above-mentioned organometallic compounds and hydrides together with the transition metal compounds of Group V of the Periodic Table are used as the catalytic system. Of the metals of Group V of the Periodic Table, the vanadium compounds are preferred. Generally, vanadium compounds which are soluble in hydrocarbons are preferred. The vanadium compounds which are soluble in hydrocarbons and are to be employed in preparing the catalyst include the halides and the oxyhalides such as $VOCl_3$, $VCl_4$, $VBr_4$ and such compounds wherein at least one of the metal valences is satisfied by a hetero atom, e.g., oxygen or nitrogen which is linked to an organic group. Compounds of this type include, for example, vanadium triacetylacetonate, vanadium tribenzoylacetonate, vanadyl diacetylacetonate, haloacetylacetonates, vanadyl trialkoxides, haloalkoxides, tetrahydrofuranates, etherates, aminates, pyridinates, and quinolinates of vanadium tri- and tetrachloride and of vanadyl trichloride. In addition, it is possible to use vanadium compounds which are in soluble in hydrocarbons, including the organic salts such as vanadium triacetate, tribenzoate and tri-stearate.

It has been discovered, however, that in order to obtain the results which are the objective of this invention, it is essential to carry out the polymerization with the aid of a catalyst system wherein at least one of the compounds contains at least one halogen atom.

Thus, in preparing the catalyst all of the above-mentioned organometallic or hydride compounds may be used with halogen-containing transition metal compounds. However, if halogen-free transition metal compounds are used, then it is necessary to use halogen-containing organometallic compounds or hydrides in preparing the catalyst. The presence of a halogen atom in either one of the catalyst components is essential to a satisfactory result.

The copolymerization reaction can be carried out at temperatures ranging from about −80° C. to +80° C. In instances where the catalysts employed are prepared from vanadium triacetylacetonate, vanadyl diacetylacetonate, vanadyl haloacetylacetonates or from any vanadium compound such as $VCl_4$ or $VOCl_3$ in the presence of aluminum alkyl halides, it is convenient to carry out both the preparation of the catalyst and the copolymerization at temperatures ranging from about 0° C. to −80° C. and preferably between −10 and −50° C. It is important to use these temperatures in order to obtain high yields of copolymer per unit weight of catalyst employed.

When operating under the above conditions, the activity of the catalysts is much greater than would be expected from the results obtained using the same catalysts but prepared at a higher temperature. Moreover, when operating at the above-mentioned temperature ranges, the activity of the catalyst is constant or remains practically unaltered throughout the polymerization process.

When the catalysts employed are prepared from vanadium triacetylacetonate, vanadyl trialkoxides, vanadyl haloalkoxides and an aluminum alkylhalide at temperatures ranging from 0° C. to 80° C., it is advantageous to operate in the presence of a complexing agent in order to obtain high yields of copolymer. These complexing agents include the ethers, thioethers, tertiary amines, and the trisubstituted phosphines containing at least one branched alkyl group or an aromatic nucleus. The ether complexing agents are represented by the formula RYR', wherein Y is oxygen or sulfur and R' represents a linear or branched alkyl group containing from 1 to 14 carbon atoms or an aromatic nucleus containing from 6 to 14 carbon atoms and wherein at least one of the R or R' is a branched alkyl group or an aromatic nucleus.

The tertiary amine complexing agents are represented by the formula

wherein R, R' and R" each represent an alkyl group containing from 1 to 14 carbon atoms or an aromatic nucleus containing 6 to 14 carbon atoms and at least one of R, R' and R" represents an aromatic nucleus.

The tertiary phosphine complexing agents are represented by the formula

wherein R, R' and R" each represent an alkyl radical containing from 1 to 14 carbon atoms or an aromatic nucleus containing 6 to 14 carbon atoms and at least one of the R's is an aromatic nucleus.

The proportion of complexing agent to be utilized in the process is preferably between 0.05 and 1.0 mole per mole of the aluminum alkyl halide.

The activity of the catalyst will vary according to the molar ratio between the catalyst-forming components. Accordingly, it has been found that if aluminum trialkyl and vanadium halides or oxyhalides are used the molar ratio of the aluminum trialkyl to vanadium compound should be between 1:1 and 5:1 and preferably between 2:1 and 4:1. In other words, the aluminum trialkyl may be present in an amount ranging from 1 to 5 moles for every mole of vanadium compound. However, it was found that if aluminum diethyl monochloride

and vanadium triacetylacetonate ($VAc_3$) are used in preparing the catalyst system, optimum results are obtained by using the $Al(C_2H_5)_2Cl$ to $VAc_3$ in a molar ratio ranging from about 2:1 to 20:1 and preferably in a molar ratio ranging from about 4:1 to about 10:1.

Copolymerization of the methylsubstituted tetrahydroindenes with ethylene or ethylene and the higher alpha-olefin involves the unsubstituted double bond of the tetrahydroindene derivative. The presence of the methyl group on a carbon atom of the double bond which remains free and is not involved in the copolymerization reaction renders such double bond incapable of participating in further reactions and therefore cross-linking during the production of the copolymerizate cannot occur even when there is a high concentration of such double bonds in the system, and even in the absence of an inert extraneous solvent.

In order to obtain copolymers which are substantially homogeneous, we found it necessary to keep the ratio between the concentrations of the monomers constant or at least as constant as possible. Thus, it may be advantageous to carry out the copolymerization by continuously feeding and discharging a constant mixture of the monomers and operating at a high spacial velocity.

The composition of the copolymer may be varied substantially by varying the composition of the mixture of monomers. In the case of binary copolymers of ethylene and a methyl-substituted tetrahydroindene, in order to obtain amorphous products having elastomeric properties it is necessary to regulate the monomeric mixture so as to obtain copolymers having a relatively high polyene content. Preferably, the diene content of the monomeric mixture should be higher than 25% by moles. If it is desirable to obtain an amorphous terpolymer of a methyl-substituted tetrahydroindene, ethylene and propylene, it is important to maintain a propylene to ethylene molar ratio of at least 4:1 in the liquid phase, corresponding to a propylene to ethylene molar ratio of at least 1:1 in the gas phase, under normal conditions. Molar ratios ranging from about 200:1 to 4:1, in the liquid phase, are satisfactory.

When butene-1 is used in place of propylene, the ratio between butene and ethylene in the liquid phase should be at least 20:1, corresponding to a butene to ethylene molar ratio in the gas phase of at least 1.5:1, under normal conditions. However, the molar ratio in the liquid phase may range from 1000:1 to 20:1.

By operating under the above-mentioned conditions, amorphous terpolymers can be obtained which contain less than 75% by moles of ethylene. At higher ethylene concentrations, the terpolymers exhibit a polyethylenic type of crystallinity. The lower limit of ethylene to be used is not critical. However, it is generally preferred that the terpolymer contain at least 5% by moles of ethylene. The higher alpha-olefin content in the amorphous terpolymer may range from a minimum of 5% by moles up to a maximum of about 95% by moles. It is convenient, however, and more particularly for economical reasons to introduce into the terpolymer an amount of the diene which is less than 20% by moles. A diene content ranging from at least 0.5 and preferably from at least 1.0 to 20 mole percent is satisfactory.

The copolymers obtained by the process of this invention exhibit properties of unvulcanized elastomers in that they have low initial elastic moduli and a very high elongation at break. By reason of the free double bonds in the macromolecules which make up the copolymers the latter can be vulcanized by methods normally employed for the unsaturated rubbers, particularly rubber having a low content of unsaturation. The vulcanized products have a high reversible elastic elongation and when reinforced with fillers such as carbon black exhibit good tensile strengths. In addition, petroleum oils and the like may be used as plasticizers or extenders. Of the many oils available, the paraffinic and naphthenic oils are preferred, but aromatic oils may be used with complete satisfaction.

The copolymers obtained in accordance with this invention may be vulcanized to obtain elastomers which, due to their superior mechanical characteristics, can be used advantageously in various fields where natural and synthetic rubbers are useful. Thus, for example, the vulcanized copolymers may be used for the preparation of manufactured shaped articles such as tubes, pipes, elastic yarns, tires, tire tubes, and similar objects which must exhibit elastomeric properties.

The following examples are given to illustrate the copolymers of this invention and methods by which such copolymers can be obtained.

EXAMPLE 1

The reaction apparatus is a glass autoclave having a capacity of 1.5 liter, provided with an agitator and a gas feeding pipe.

Into the autoclave maintained at −10° C., there are introduced 1,000 cc. of liquid propylene and 60 cc. of 3-methylbicyclo-(4,3,0)-nonadiene-3,7. Ethylene is then added up to a pressure increase of 0.9 atm.

From two separate metering devices the catalyst components are introduced into the reactor: first 8 millimols of aluminum ethyl sesquichloride [½ Al$_2$(C$_2$H$_5$)$_3$Cl$_3$] dissolved in 8 cc. of anhydrous n-heptane and then 1.6 millimols of VOCl$_3$ dissolved in 1.6 cc. of anhydrous n-heptane.

The polymerization starts immediately with the formation of a product insoluble in the reaction medium. The temperature is kept at −10° C. and the pressure is kept constant by feeding in an amount of ethylene equal to the amount absorbed during the copolymerization.

After 50 minutes the reaction is stopped. Any unreacted olefins are removed and the product is purified in a separating funnel by repeated treatments with aqueous hydrochloric acid and then with water and is coagulated with acetone. After drying under vacuum, there are obtained 105 g. of a solid terpolymerizate which is amorphous on X-rays examination, completely soluble in boiling n-heptane and looks like a non-vulcanized elastomer.

The infrared spectrographic examination shows the presence of unsaturations (bands at 6.05 and 12.5 microns). The propylene content is 53.5% by weight.

The Mooney viscosity ML(1+4) at 100° C. is 115.

100 parts by weight of the terpolymerizate are mixed in a laboratory roll mixer with 50 parts of HAF carbon black, 1 part of phenyl-beta-naphthylamine, 2 parts of sulphur, 5 parts of zinc oxide, 1 part of tetramethylthiuram disulphide and 0.5 part of mercaptobenzothiazole.

The mixture is vulcanized in a press at 150° C. for various times. The properties of the vulcanizates thus obtained are reported in the following table.

| Vulcanization time, minutes | Tensile strength, kg./cm.$^2$ | Elongation at break, percent | Modulus at 300%, kg./cm.$^2$ | Permanent set, percent |
| --- | --- | --- | --- | --- |
| 10 | 208 | 690 | 68 | 18 |
| 30 | 242 | 485 | 134 | 10 |
| 60 | 246 | 445 | 151 | 9 |
| 90 | 248 | 460 | 143 | 8 |
| 120 | 242 | 460 | 141 | 10 |

EXAMPLE 2

1,000 cc. of liquid propylene and 60 cc. of 3-methylbicyclo (4, 3, 0) nonadiene-3,7 are introduced into reaction apparatus as described in Example 1, kept at −10° C.

Ethylene is introduced until a pressure increase of 0.9 atmosphere is obtained.

From two separate metering devices the catalyst components are introduced into the reactor: first 10 millimols of aluminum diethyl monochloride dissolved in 10 cc. of anhydrous n-heptane and then 2 millimols of vanadium tetrachloride dissolved in 2 cc. of anhydrous n-heptane.

The polymerization starts immediately with the formation of a product insoluble in the reaction medium.

The temperature is kept at −10 C. and the pressure is kept constant by feeding in an amount of ethylene equal to the amount absorbed during the copolymerization.

After 80 minutes the reaction is stopped. Any unreacted olefins are removed and the product is purified and isolated as described in Example 1.

After vacuum drying, there are obtained 96 g. of a solid terpolymerizate which is amorphous on X-rays examination, completely soluble in boiling n-heptane and looks like a non-vulcanized elastomer.

The infrared spectrographic examination shows the presence of unsaturations (bands at 6.05 and 12.5 microns). The propylene content is 52% by weight.

The terpolymer is vulcanized with the mix and the modalities of Example 1 for 60 minutes, to obtain the vulcanized lamina having the following characteristics:

Tensile strength: 225 kg./cm.$^2$
Elongation at break: 365%
Modulus at 300%: 178 kg./cm.$^2$
Permanent set: 7%

EXAMPLE 3

1,000 cc. of liquid propylene and 60 cc. of 3-methyl bicyclo(4, 3, 0)-nonadiene 3, 7 are introduced into reaction apparatus as described in Example 1.

Ethylene is introduced until a pressure increase of 0.9 atm. is obtained.

The catalyst components are introduced into the reactor first 10 millimols of aluminum diethyl monochloride dissolved in 10 cc. of anhydrous n-heptane and then 2 millimols of vanadium oxytrichloride dissolved in 2 cc. of anhydrous n-heptane.

The polymerization starts immediately with the formation of a product insoluble in the reaction medium.

The temperature is kept at −10° C. and the pressure is kept constant by feeding in an amount of ethylene equal to the amount absorbed during the reaction.

After 60 minutes the reaction is stopped. Any unreacted olefins are removed and the product is purified and isolated as described in Example 1.

After vacuum drying, there are obtained 107 g. of a solid terpolymerizate which is amorphous on X-rays examination, completely soluble in boiling n-heptane and looks like a non-vulcanized elastomer.

The infrared spectographic examination shows the presence of unsaturations (bands at 6.05 and 12.5 microns). The propylene content is 56% by weight.

The terpolymer is vulcanized with the mix and the modalities of Example 1 for 60 minutes. A vulcanized lamina having the following characteristics is thus obtained:

Tensile strength: 210 kg./cm.$^2$
Elongation at break: 350%
Modulus at 300%: 165 kg./cm.$^2$
Permanent set: 8%

EXAMPLE 4

1,000 cc. of anhydrous n-heptane and 70 cc. of 3,4-dimethyl-bicyclo-(4, 3, 0)-nonadiene 3,7 are introduced into reaction apparatus as described in Example 1, kept at −10° C.

Ethylene is introduced until a pressure increase of 0.9 atm. is obtained.

From two separate metering devices, the catalyst components are introduced into the reactor: first 10 millimols of aluminum diethyl monochloride dissolved in 10 cc. of anhydrous n-heptane and then 2 millimols of vanadium oxytrichloride in 2 cc. of anhydrous n-heptane.

The polymerization starts immediately with the formation of a product insoluble in the reaction medium. The temperature is kept at −10° C. and the pressure is kept constant by feeding in an amount of ethylene equal to the amount absorbed during the polymerization.

After 60 minutes the reaction is stopped. The olefins are removed and the product is purified and isolated as described in Example 1.

After vacuum drying there are obtained 92 g. of a solid terpolymerizate which is amorphous on X-rays examination, looks like a non-vulcanized elastomer and is completely soluble in boiling n-heptane. The propylene content is 52% by weight.

The terpolymer is vulcanized with the mix and the modalities of Example 1, for 60 minutes.

A vulcanized lamina having the following characteristics is obtained:

Tensile strength: 223 kg./cm.$^2$
Elongation at break: 330%
Modulus at 300%: 160 kg./cm.$^2$

EXAMPLE 5

1,000 cc. of liquid propylene and 60 cc. of 3-methyl-bicyclo(4, 3, 0)-nonadiene 3,7 are introduced into reaction apparatus as described in Example 1, and kept at −10° C. Ethylene is introduced until a pressure increase of 0.9 atm. is obtained.

From two separate metering devices the catalyst components are introduced: first 5 millimols of aluminum diethyl monochloride dissolved in 5 cc. of anhydrous n-heptane and then 1 millimole of vanadium tetrachloride dissolved in 1 cc. of anhydrous n-heptane.

A molecular weight regulator (2 millimols of diethyl zinc in 2 cc. of anhydrous n-heptane) is introduced from a third metering device.

The polymerization starts immediately with the formation of a product insoluble in the reaction medium.

The temperature is kept at −10° C. and the pressure is kept constant by feeding in an amount of ethylene equivalent to the ethylene absorbed during the copolymerization.

After 40 minutes the reaction is stopped. Any unreacted olefins are removed and the product is purified and isolated as described in Example 1.

After vacuum drying 57 g. of a solid terpolymerizate which is amorphous on X-rays examination, looks like a non-vulcanized elastomer and is completely soluble in boiling n-heptane is obtained.

The infrared spectrographic examination shows the presence of unsaturations (bands at 6.05 and 12.5 microns). The propylene content is 51% by weight. The Mooney viscosity ML (1+4) measured at 100° C., is 109.

The terpolymer is vulcanized with mix and the modalities of Example 1 for 60 minutes.

A vulcanized lamina having the following characteristics is obtained.

Tensile strength: 249 kg./cm.$^2$
Elongation at break: 435%
Modulus at 300%: 157 kg./cm.$^2$
Permanent set: 8.5%

EXAMPLE 6

1,000 cc. of liquid propylene and 60 cc. of 3-methyl-bicyclo-(4,3,0)-nonadiene 3,7, are introduced into reaction apparatus as described in Example 1.

Ethylene is introduced until a pressure increase of 0.9 atm. is obtained.

From two separate metering devices the catalyst components are introduced into the reactor: first 10 millimols of aluminum diethyl monochloride dissolved in 10 cc. of anhydrous n-heptane and then 2 millimols of vanadium triacetylacetonate dissolved in 2 cc. of anhydrous toluene.

The reaction starts immediately with the formation of a product insoluble in the reaction medium. The temperature is kept at −10° C. and the pressure is kept constant by feeding in an amount of ethylene equal to the amount absorbed during the copolymerization.

After 60 minutes the reaction is stopped. Any unreacted olefins are removed and the product is purified and isolated as described in Example 1.

After vacuum drying, there are obtained 49 g. of a solid terepolymerizate which is amorphous on X-rays examination, looks like a non-vulcanized elastomer and is completely soluble in boiling n-heptane.

The infrared spectrographic examination shows the presence of unsaturations (bands at 6.05 and 12.5 microns). The propylene content is 47% by weight.

The terpolymer is vulcanized with the mix and the modalities of Example 1 for 60 minutes, to obtain a vulcanized lamina having the following characteristics:

Tensile strength: 249 kg./cm.$^2$
Elongation at break: 435%
Modulus at 300%: 157 kg./cm.$^2$
Permanent set: 8.5%

EXAMPLE 7

9 liters of liquid propylene and 850 cc. of 3-methyl-bicyclo - (4,3,0) - nonadiene-3,7 are introduced into a 9 liters stainless steel autoclave provided with comb stirrer and cooled by means of a heptane-CO$_2$ cooling mixture.

The temperature is brought to −10° C. and the liquid phase is saturated with ethylene. The ethylene pressure in the autoclave is brought up to 3.5 atm. gauge. 8.75 g. Et$_2$AlCl in heptane solution (containing 27 g. of Et$_2$AlCl in 100 cc. of solution) 2.8 g. of vanadium tetrachloride in heptane solution (containing 6 g. vanadium tetrachloride in 100 cc. of solution) and 2 g. zinc diethyl as molecular weight regulator, dissolved in 17 cc. of heptane are then added.

During the polymerization 2.5 g. of aluminum diethyl monochloride and 0.8 g. VCl$_4$ are added in three equally spaced portions.

The temperature is kept at −10° C. and the pressure is maintained constant at 3.5 atm. gauge by feeding in an amount of ethylene equal to the absorbed ethylene.

After 90 minutes, the autoclave is discharged and the polymer suspension is collected in a vessel containing 2 liters of methanol and 1 g. 2,2' methylene bis(4-ethyl-6 tert. butylphenol).

The unreacted propylene and a portion of the diene are stripped with vapor. The terpolymer, to which 0.2% by weight of the above indicated stabilizer is added, is then completely dried on a calender.

1,100 g. of polymer having a Mooney viscosity of ML(1+4) at 100° C.=43 and which is completely soluble in boiling $CCl_4$ are obtained. The terpolymer contains 55.5% by weight of propylene as shown by infrared analysis. It is vulcanized at 150° C. for 60 minutes with the aid of a mix containing:

| | Parts by weight |
|---|---|
| Terpolymer | 100 |
| Sulfur | 2 |
| HAF black | 50 |
| ZnO | 5 |
| Phenyl-beta-naphthylamine | 1 |
| Tetramethylthiuramdisulphide | 1 |
| Mercaptobenzothiazole | 0.5 |

The mechanical characteristics of the vulcanizate are as follows:

Tensile strength (kg./cm.$^2$): 205
Elongation at break (percent): 380
Modulus at 300% (kg./cm.$^2$): 158
Permanent set (percent): 6.5

EXAMPLE 8

Example 7 is repeated by initially employing: 8.2 g. diethyl aluminum monochloride and 2.6 g. vanadium tetrachloride. 1470 g. of terpolymer having a Mooney viscosity of 109 are obtained. The propylene content was 56% by weight.

From this terpolymer, vulcanized with the same mix as given in the preceding example, a vulcanizate having the following characteristics is obtained:

Tensile strength (kg./cm.$^2$): 236
Elongation at break (percent): 365
Modulus at 300% (kg./cm.$^2$): 184
Permanent set (percent): 6.5

EXAMPLE 9

The reaction apparatus used consists of a glass cylinder having a diameter of 7.5 cm. and a capacity of 1000 cc. provided with a stirrer and inlet and outlet pipes for the gases, immersed in a thermostatic bath at −20° C. The gas inlet pipe extends to the cylinder bottom and ends in a porous diaphragm (diameter 3.5 cm.). Into the apparatus, kept at −20° C., there were introduced 700 cc. of anhydrous n-heptane and 7 cc. of 3-methyl-bicyclo-(4,3,0)-nonadiene-3,7. Through the gas inlet tube, a gaseous ethylene-propylene mixture in a molar ratio of 1:4 was introduced and circulated at the rate of 400 N l./h.

The catalyst was preformed in a 100 cc. flask by reacting 0.5 millimol of vanadium tetrachloride and 2.5 millimoles of diethyl aluminum monochloride in 30 cc. of anhydrous n-heptane, under nitrogen and at −20° C.

The catalyst was siphoned into the reactor by means of nitrogen pressure. The gaseous mixture was continuously fed and discharged at a rate of 400 N l./h. About 10 minutes after the introduction of the catalyst, the reaction was stopped by adding 10 cc. of methanol containing 0.1 g. of phenyl-beta-naphthylamine.

The product was purified and isolated as in preceding examples and purified in a separating funnel under nitrogen by repeated treatments with aqueous hydrochloric acid and then with water. It was finally coagulated with acetone.

After vacuum drying, 20 g. of a solid product was obtained which was amorphous under X-rays examination, was completely soluble in boiling n-heptane and looked like a non-vulcanized elastomer.

The terpolymer was vulcanized with the aid of a mixture of 1 part of phenyl-n-naphthylamine, 2 parts of sulfur, 5 parts of zinc oxide, 1 part of tetramethylthiuram disulphide and 0.5 part of mercaptobenzothiazole. This mixture was vulcanized in a press for 60 minutes at 150° C. A vulcanized sheet having the following characteristics was obtained:

Tensile strength: 40 kg./cm.$^2$
Elongation at break: 670%
Modulus at 300%: 20 kg./cm.$^2$
Permanent set at break: 10%

EXAMPLE 10

This example is given to illustrate the preparation of a 5.20–14 two plies tire comprising a copolymer according to the invention.

Rubberized plies

Fabric: treated and stretched rayon; 20 yarns (diameter 1 mm.) per inch; single adhesive treatment with a heptane solution containing 10% of a mix of chlorosulfonated ethylene-propylene copolymer (Table 1) and then rubberizing in the 4 rolls calender at the temperature of 40–50° C.

Rubberizing mix: see Table 2.

Cut angles of 52° with respect to the yarns directions (3 lappings).

Tread

Tread band and sidewall coverings obtained in the extruder provided with flat die under the following conditions:

Temperature of the extruder body: 60° C.
Temperature of the extruder head: 100° C.

Tread mix: see Table 3.

Wire rings

Piano steel wire having a diameter of 1 mm. sandblasted and spread with Thixon [1] DCP/1 (Primer) and Thixon [1] XAP 386.

In the extruder a thin layer of very hard mix (Table 4) was placed on the wire.

The wire ring consists of 15 rounds of wire held together by a thin strip of a mix of Table 4.

Assembling (Herbert assembling machine)

The assembling is carried out according to the normal techniques of manufacturing two-plies 5.20–14 tires.

Shaping and vulcanization (Herbert press of the "Aubo 36" type)

Saturated steam under 15 atm. in the rubber bag and in the jacket of the molds.

Vulcanization time: 15'+5' of cooling with water.

Tire test

Road-wheel under the following conditions:

Diameter of the road-wheel: 90 cm.
Speed: 60 km./h.
Load: 600 kg.
Inflating pressure in the cold: 2 atm.
Room temperature: about 30° C.

---
[1] Products supplied by the Sayton Chemical Co.

13

The results are reported in Table 5 (comparison between terpolymer tire and commercial tire).

Table 1

Cement mix:
- Chlorosulfonated ethylene-propylene copolymer (copolymer having an initial Mooney viscosity 25 ML(1+4)100° C. chlorosulfonated with $Cl_2$ and $SO_2$ in $CCl_4$ and in the presence of actinic light. Final product: Cl=1.54%; S=0.9%) _____ 100
- Natural rubber _____ 20
- Silica (Durosil) _____ 50
- $TiO_2$ _____ 20
- MgO _____ 2
- Diphenylguanidine _____ 1
- Sulfur _____ 2.8
- α,α'-Bis(tert. butylperoxy)-p-diisopropylbenzene (considered as 100%) _____ 3

Table 2

Rubberizing mix:
- Terpolymer (extended with Preadix 8 oil to obtain a polymer-oil mixture having a Mooney viscosity of 25) _____ 100
- Carbon black HAF _____ 30
- Phenyl-beta-naphthylamine (FBNA) _____ 1
- ZnO _____ 5
- Mercaptobenzothiazole (MBT) _____ 0.5
- Tetramethylthiuram disulfide (TMTDS) _____ 1
- Sulfur _____ 2

Mooney viscosity of the mix: 35 ML(1+4) 100° C.

Physical characteristics

- Tensile strength _____ kg./cm.$^2$ __ 120
- Elongation at break _____ Percent __ 440
- Modulus at 300% elongation _____ kg./cm.$^2$ __ 70
- Permanent set under traction _____ Percent __ 4
- Tear strength _____ kg.g/cm. __ 28
- Rebound elasticity at 50° C. _____ Percent __ 67
- Hysteresis heat (HBU 20 pounds) _____ ° C. __ 27
- IRHD hardness _____ 57

Table 3

Tread mix:
- Terpolymer (extended with Preadix 8 oil to obtain a polymer+oil mixture having a Mooney viscosity of about 25) _____ 100
- Carbon black ISAF _____ 50
- Phenyl-beta-naphthylamine (FBNA) _____ 1
- ZnO _____ 5
- Stearic acid _____ 0.5
- Mercaptobenzothiazole (MBTZ) _____ 0.5
- Tetramethylthiuram-disulfide (TMTDS) _____ 1
- Sulfur _____ 2

Mooney viscosity of the mix: 50 ML (1+4) 100° C.

Physical characteristics

- Tensile strength _____ kg./cm.$^2$ __ 175
- Elongation at break _____ Percent __ 420
- Modulus at 300% elongation _____ kg./cm.$^2$ __ 115
- Permanent set under traction _____ Percent __ 6
- Tear strength _____ kg./cm. __ 50
- Rebound elasticity at 50° C. _____ Percent __ 53
- Hysteresis heat (Goodrich 20 pounds) _____ ° C. __ 40
- IRHD _____ 70
- Loss by abrasion (Akron cm.$^3$/1000 round) About 0.130

Table 4

Mix for the small rings:
- Terpolymer (extended with Preadix 8 oil to obtain a polymer+oil mixture having a Mooney viscosity of about 25) _____ 100
- Carbon black HAF _____ 100
- ZnO _____ 5
- FBNA _____ 1
- Solid paraffin _____ 3
- MBT _____ 0.5
- TMTDS _____ 1
- S _____ 2

Physical characteristics

- Tensile strength _____ kg./cm.$^2$ __ 148
- Elongation at break _____ Percent __ 160
- Modulus at 100% elongation _____ kg./cm.$^2$ __ 85
- Tear strength _____ kg./cm. __ 43
- IRHD hardness _____ 80

TABLE 5.—ROAD-WHEEL TEST
[Comparison between terpolymer tire and a commercial tire]

| Tire type | Time, hours | ΔT, inside | ΔT outsid |
|---|---|---|---|
| Commercial tire two plies | 30+50 | 55 | 35+40 |
| Terpolymer tire two plies | 80+120 | 55 | 35+40 |

The temperature inside the tire was measured through the valve of the air tube.

The temperature outside the tire was measured in the notches of the tread.

As will be apparent, changes in details may be made in practicing this invention without departing from the spirit thereof. Therefore, we intend to include in the scope of the appended claims all such modifications as will be obvious to those skilled in the art from the description and working examples given herein.

What is claimed is:

1. A high molecular weight linear, amorphous copolymer of a methyl-substituted tetrahydroindene selected from the group consisting of 6-methyl-4,7,8,9 tetrahydroindene and 5,6-dimethyl-4,7,8,9-tetrahydroindene and at least one monomer selected from the group consisting of ethylene and higher alpha-olefins of the general formula R—CH=CH$_2$ wherein R is an alkyl group containing from 1 to 6 carbon atoms; said copolymer comprising macromolecules containing unsaturations and consisting of copolymerized units of each of said monomers.

2. A high molecular weight linear, amorphous copolymer according to claim 1, further characterized in that the alpha-olefins are ethylene, propylene and butene-1.

3. A high molecular weight linear, amorphous copolymer according to claim 2, further characterized in that the methyl-substituted tetrahydroindene is 6-methyl-4,7,8,9-tetrahydroindene.

4. A high molecular weight linear, amorphous copolymer according to claim 2, further characterized in that the methyl-substituted tetrahydroindene is 5,6-dimethyl-4,7,8,9-tetrahydroindene.

5. A high molecular weight linear, amorphous copolymer according to claim 1, further characterized in that one of the olefins is ethylene.

6. A high molecular weight linear, amorphous copolymer according to claim 1, further characterized in that one of the higher alpha-olefins is propylene.

7. A high molecular weight linear, amorphous copolymer according to claim 1, further characterized in that one of the higher alpha-olefins is butene-1.

8. A high molecular weight linear, amorphous copolymer according to claim 1, further characterized in that the methyl-substituted tetrahydroindene is 6-methyl-4,7,8,9-tetrahydroindene.

9. A high molecular weight linear, amorphous copolymer according to claim 1, further characterized in that the methyl-substituted tetrahydroindene is 5,6-dimethyl-4,7,8,9-tetrahydroindene.

10. The sulfur-vulcanized copolymers of claim 1.

11. Manufactured shaped articles of a sulfur-vulcanized copolymer according to claim 10.

12. A rubber tire comprising a sulfur-vulcanized copolymer according to claim 10.

13. The process of preparing high molecular weight linear, amorphous copolymers from a methyl-substituted tetrahydroindene selected from the group consisting of 6-methyl-4,7,8,9-tetrahydroindene and 5,6-dimethyl-4,7,8,9-tetrahydroindene and at least one monomer selected from the group consisting of ethylene and higher alpha-olefins of the general formula R—CH=CH$_2$ wherein R is an alkyl radical group containing from 1 to 6 carbon atoms, which comprises subjecting a mixture of said monomers to copolymerizing conditions in contact with a halogen-containing catalyst prepared by mixing (1) a compound of a transition metal of Group V of the Mendelyeev Periodic Table and (2) a compound selected from the group consisting of organometallic compounds and hydrides of the metals of Groups I, II and III of the Periodic Table, wherein at least one of components (1) and (2) contains at least one halogen atom.

14. The process of claim 11, further characterized in that the organometallic compounds and hydrides are complex compounds of the metals of Groups I and III of the Periodic Table.

15. The process according to claim 13, further characterized in that the mixture of monomers is subjected to copolymerizing conditions in contact with the catalyst in the essential absence of an inert extraneous solvent and using the mixture of the monomers, maintained in the liquid state, as the copolymerization medium.

16. The process of claim 15, further characterized in that the halogen-containing catalyst is a chlorine-containing catalyst.

17. The process of claim 15, further characterized in that the transistion metal is vanadium.

18. The process of claim 15, further characterized in that the copolymer is prepared from a methyl-substituted tetrahydroindene, ethylene, and propylene and the propylene to ethylene molar ratio maintained in the reacting liquid phase is at least 4:1.

19. The process of claim 15, further characterized in that the copolymer is prepared from a methyl-substituted tetrahydroindene, ethylene and butene-1 and the butene to ethylene molar ratio maintained in the reacting liquid phase is at least 20:1.

No references cited.

JOSEPH L. SCHOFER, Primary Examiner

R. S. BENJAMIN, Assistant Examiner

U.S. Cl. X.R.

260—80.78, 88.2